United States Patent [19]

Peterson

[11] Patent Number: 4,557,651
[45] Date of Patent: Dec. 10, 1985

[54] CLINCH NUT AND ASSEMBLY MACHINE

[75] Inventor: Francis C. Peterson, St. Charles, Ill.

[73] Assignee: Illinois Tool Works, Inc., Chicago, Ill.

[21] Appl. No.: 308,209

[22] Filed: Oct. 5, 1981

Related U.S. Application Data

[63] Continuation-in-part of Ser. No. 118,300, Feb. 4, 1980, abandoned.

[51] Int. Cl.$^4$ ............................................. F16B 19/08
[52] U.S. Cl. .................................. 411/181; 411/180; 411/103; 411/113; 411/38; 29/522 A
[58] Field of Search .................................. 411/34–38, 411/103, 111–113, 170–177, 179–181, 183, 184, 186, 189, 433, 403, 437, 404, 523–526; 29/522 R, 522 A, 523

[56] References Cited

U.S. PATENT DOCUMENTS

| | | | |
|---|---|---|---|
| 2,298,568 | 10/1942 | Kost | 411/175 |
| 2,397,216 | 3/1946 | Stellin | 411/404 |
| 2,409,702 | 10/1946 | Luce | 411/38 |
| 2,445,978 | 7/1948 | Stellin | 411/404 |
| 3,282,317 | 11/1966 | Zahodiakin | 411/179 |
| 3,304,830 | 2/1967 | Shackelford | 411/34 |
| 3,824,675 | 7/1974 | Ballantyne | 411/179 |
| 3,985,172 | 10/1976 | Ballantyne | 411/179 |
| 3,987,830 | 10/1976 | Ladouceur | 411/179 |
| 4,202,750 | 5/1980 | Khoury | 29/522 A |

FOREIGN PATENT DOCUMENTS

| | | | |
|---|---|---|---|
| 781704 | 4/1968 | Canada | 411/34 |
| 2302441 | 9/1976 | France | 411/38 |

Primary Examiner—Kenneth J. Dorner
Assistant Examiner—Neill Wilson
Attorney, Agent, or Firm—David I. Roche; Thomas W. Buckman

[57] ABSTRACT

A sheet metal clinch nut receives an extruded portion of the workpiece in an aperture in the nut. Part of the extruded portion is swaged radially outwardly of the aperture and locks or clinches the nut onto the workpiece. A screw threads into the nut below the extruded portion of the workpiece. In some forms of the invention the nut is tubular. In other forms the nut comprises a pair of generally parallel arms. The extruded portion of the workpiece extends through an aperture in the first arm and rotation preventing teeth or serrations lock the nut against rotational movement. A self-tapping fastener is inserted creating threads in the workpiece extrusion and then in a second arm of the clinch nut. Tightening of the fastener causes the second arm to deflect toward the first locking the fastener against rotrograde movement. Also disclosed is a simple tool for advancing an interconnected strip of clinch nuts, severing the leading nut and staking the workpiece to it.

9 Claims, 42 Drawing Figures

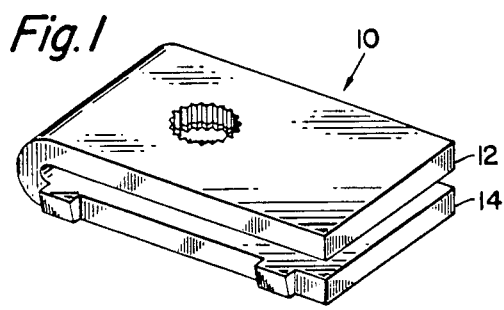
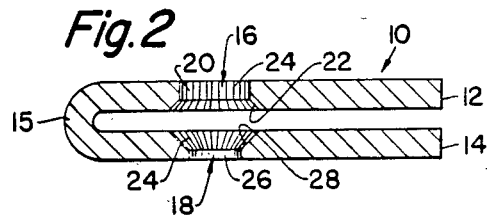
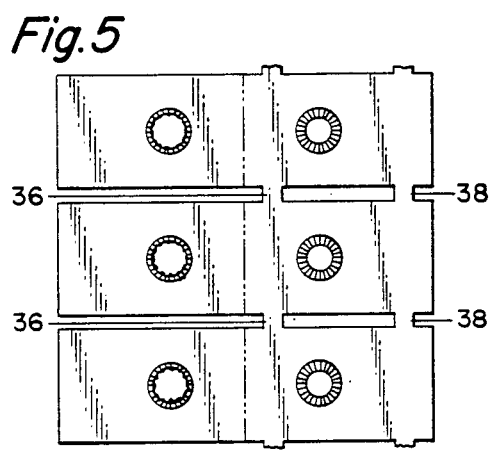
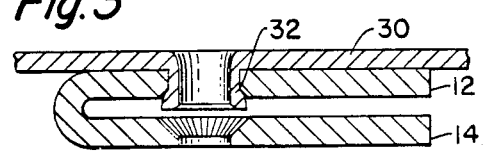
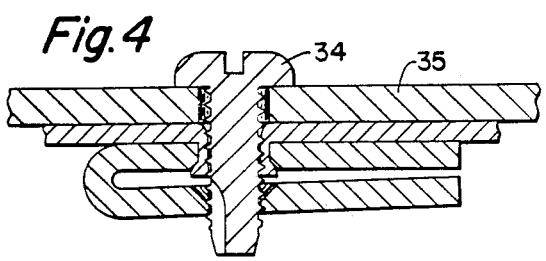
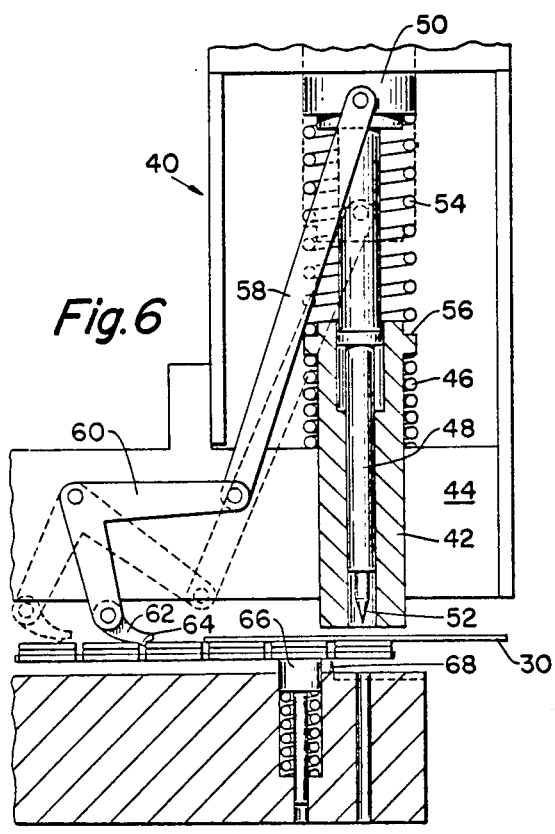
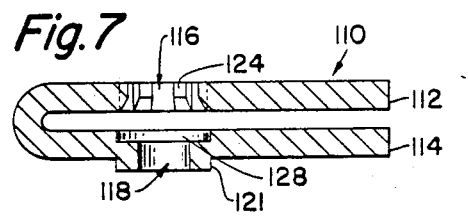
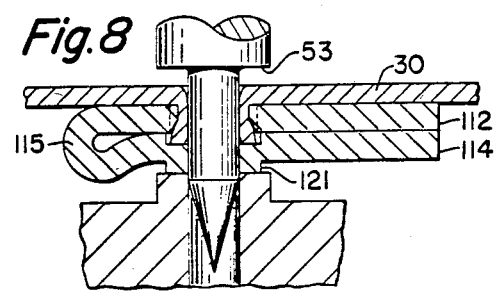
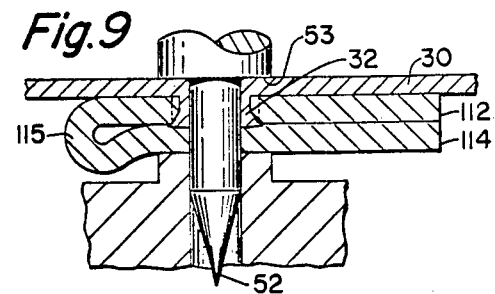

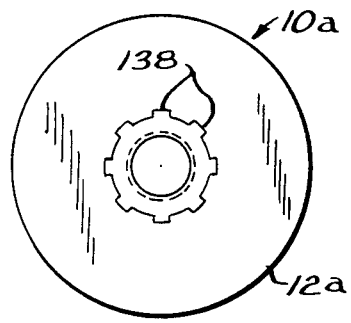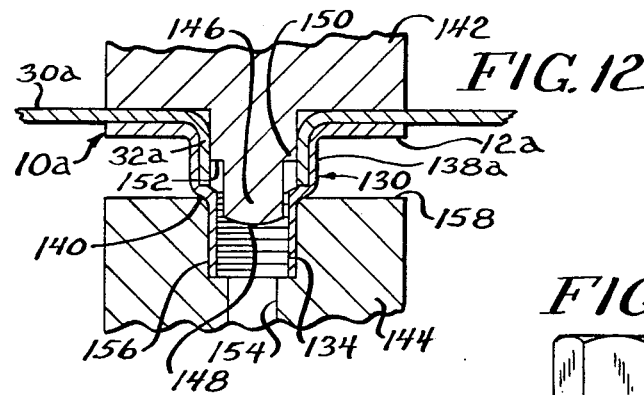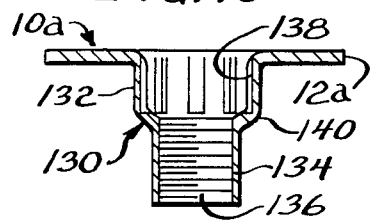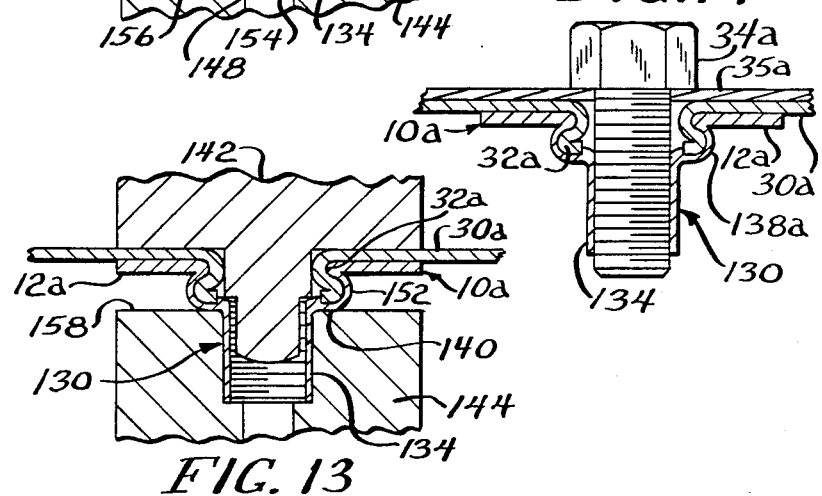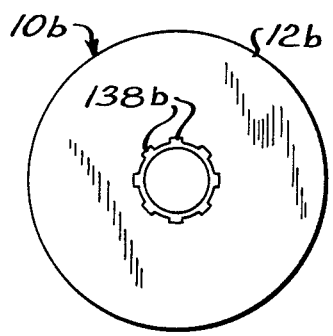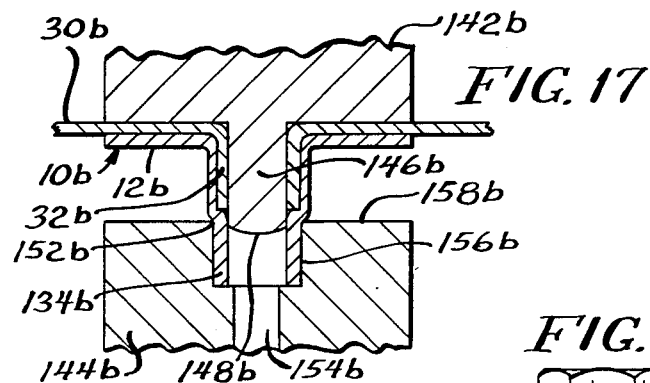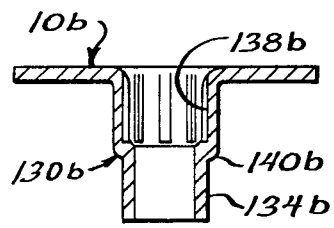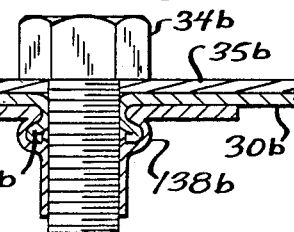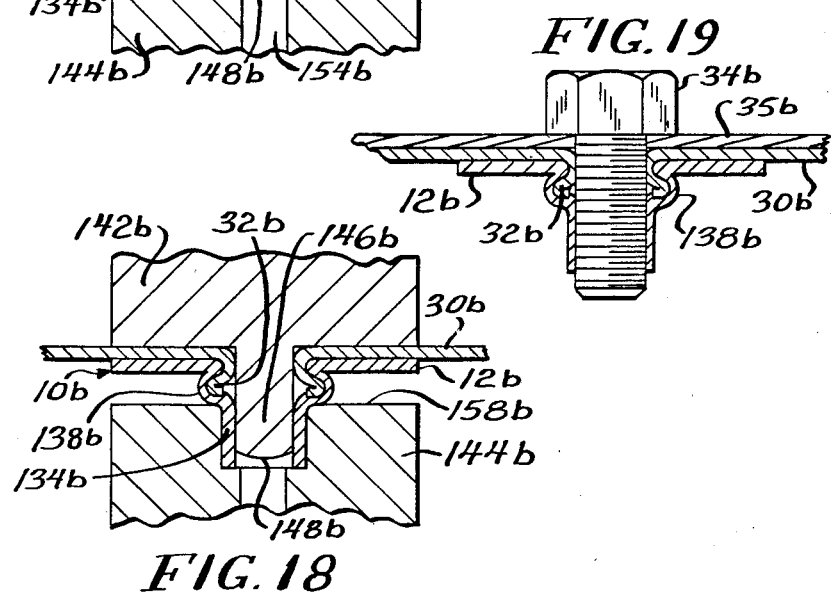

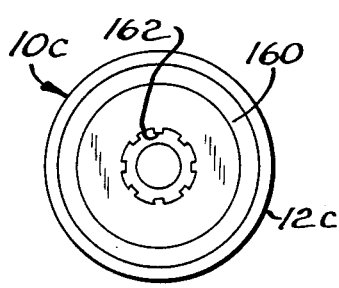
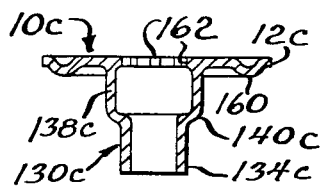
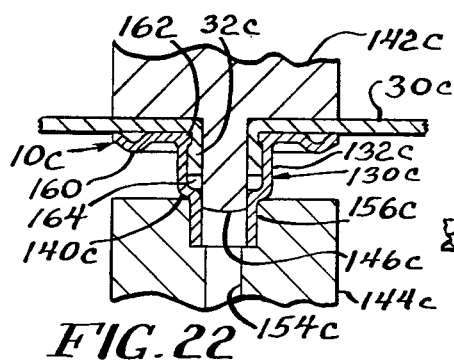
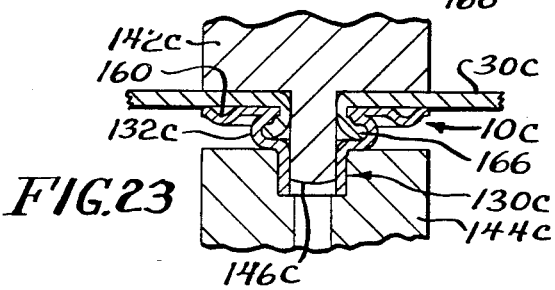
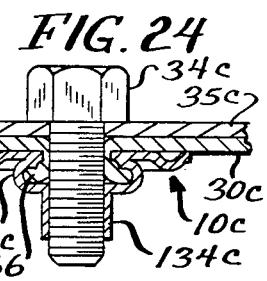
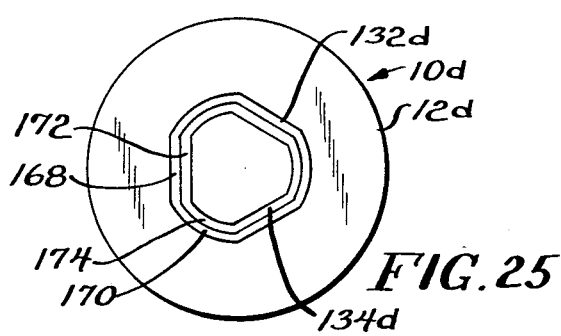
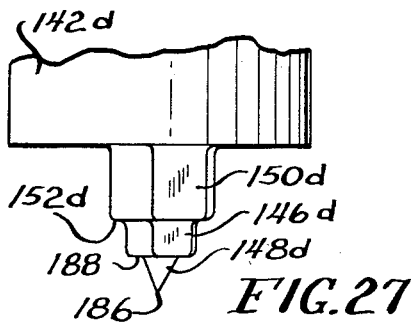
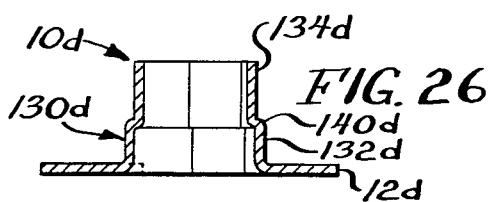
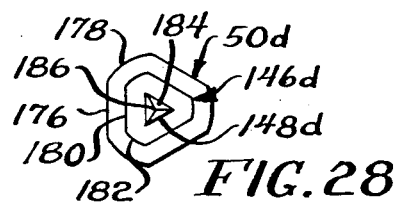
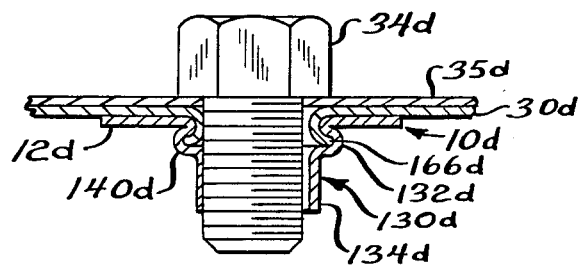

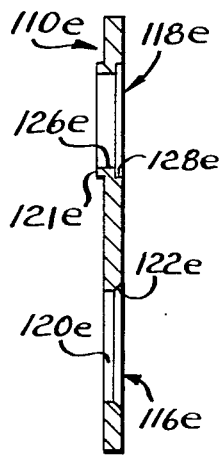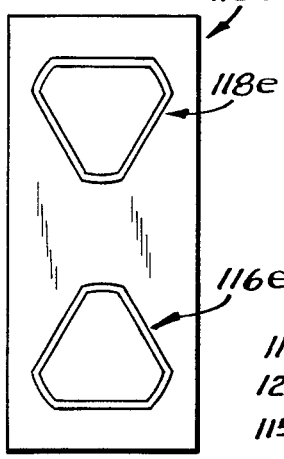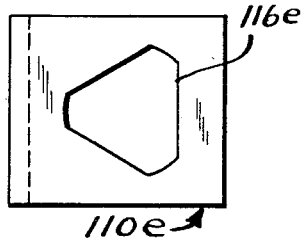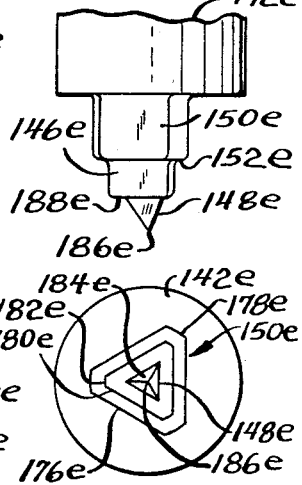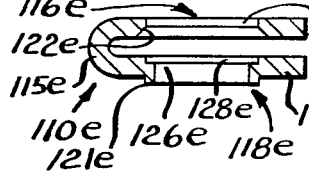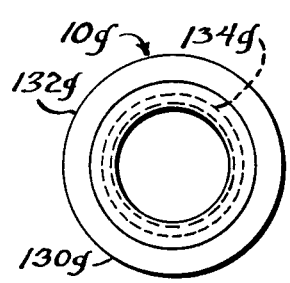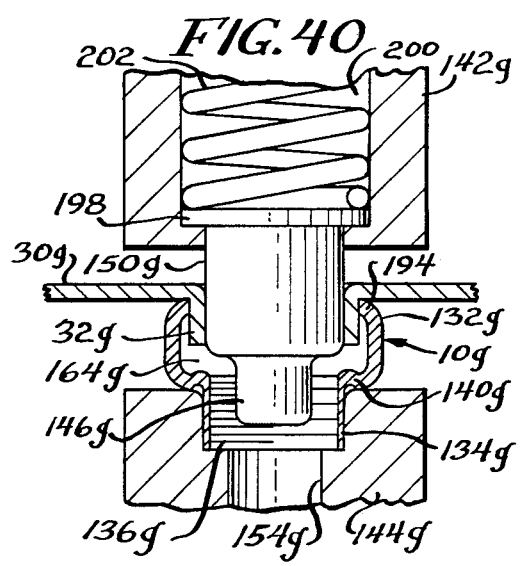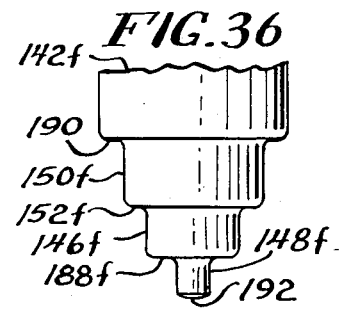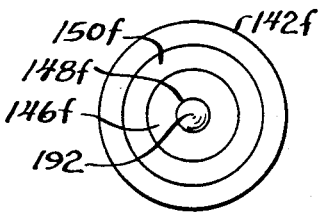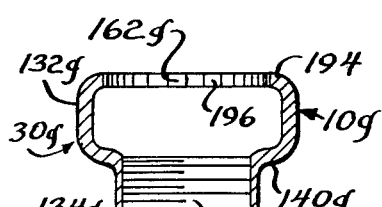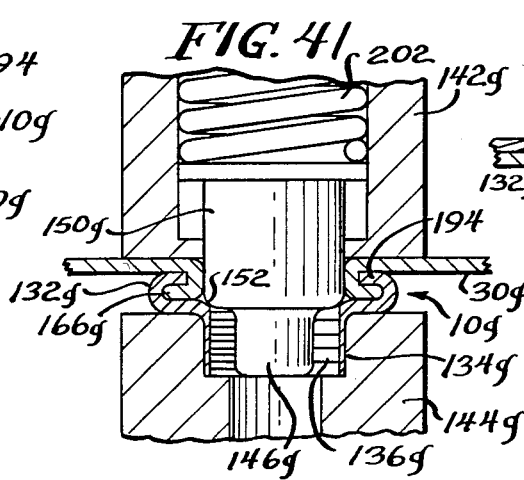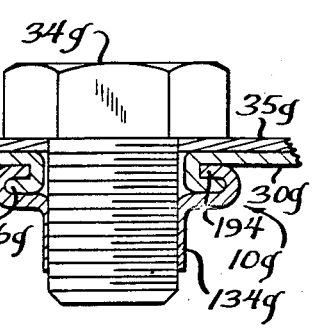

4,557,651

CLINCH NUT AND ASSEMBLY MACHINE

RELATION TO OTHER APPLICATIONS

The present application comprises a continuation-in-part of my prior application Ser. No. 118,300 filed Feb. 4, 1980, now abandoned.

BACKGROUND AND SUMMARY OF THE INVENTION

The present invention is directed to a clinch nut and apparatus for installing this clinch nut to a workpiece. More particularly, the present invention is directed to a sheet metal clinch nut which can be easily and economically manufactured and installed.

Several attempts have been made to devise a clinch nut with space to receive a workpiece extrusion so that the nut may be staked into position on a workpiece. These prior clinch nuts are made from rod stock and necessarily involve expensive manufacturing steps of boring, counterboring and thread tapping in addition to the difficulties in handling and machining such parts. Further, each of these clinch nuts relies on an undercut to receive extruded material to retain the nut to the workpiece. Such undercuts are difficult to machine and unreliable in their retention characteristics due to the reluctance of the extruded metal to fill the undercut.

The present invention overcomes the difficulties and deficiencies of these prior art clinch nuts. The clinch nut in one form of the present invention comprises first and second arms which are interconnected. The first and second arms are stamped from sheet material and each arm includes an aperture which can be formed during the stamping step or easily added or modified during a secondary machining step. The clinch nut is bent into a U-shaped configuration to bring the two apertures into axial alignment with the interconnecting portion forming the base of the U. One aperture is larger than the other so as to accommodate an extruded portion of the workpiece. The other aperture is sized to accommodate a self-tapping screw shank which initially taps into the extruded metal and then into the aperture in the second arm. As the screw is tightened into the clinch nut, it will draw the second arm angularly towards the first as a result of the resilience of the spring arm formed by the interconnecting portion at the base of the U. This will effectively cause a locking of the threads and prevent backing out of the fastener. In addition, whereas most clinch nuts must be made for a particular workpiece thickness, the clinch nut of the present invention can accommodate a range of material thicknesses since the area between the two arms can accommodate the additional extruded material.

In other forms of the present invention the nut has a tubular body with an entering portion of relative large diameter for receipt of the extruded portion of the workpiece, and an extended portion of lesser diameter for threaded association with a screw. The larger diameter portion is axially collapsed upon itself to surround and grip a part of the workpiece extrusion.

The clinch nut of the present invention is capable of improved retention by the workpiece, can be more easily and cheaply made of sheet metal, and can provide a locking feature not available with prior art clinch nuts. These and other features, advantages and objects of the present invention will be more fully appreciated following a reading of the following description when taken in conjunction with the accompanying drawings.

BRIEF DESCRIPTION OF THE DRAWINGS

FIG. 1 is a perspective view of one form of the clinch nut of the present invention;

FIG. 2 is a cross-sectional side elevation taken along lines 2—2 in FIG. 1;

FIG. 3 is a cross section similar to FIG. 2 showing the workpiece material extruded into the nut;

FIG. 4 is a cross-sectional side elevation depicting a fastener retaining a panel to the base workpiece;

FIG. 5 is a top elevational view of a strip of clinch nuts as they exit the punch before the arms are bent parallel;

FIG. 6 is a side elevational schematic of an installation tool useful in staking the workpiece into the nut;

FIG. 7 is a cross-sectional side elevation of a second embodiment of the present invention;

FIG. 8 is a side view of an initial step in the staking of the FIG. 7 embodiment;

FIG. 9 is a side view of the FIG. 7 clinch nut as the staking is completed just prior to retraction of the punch;

FIG. 10 is a top view of a nut comprising third embodiment of the invention in which the nut has a tubular body;

FIG. 11 is an axial sectional view through the nut of FIG. 10;

FIG. 12 is an axial sectional view similar to FIG. 11 showing a portion of the workpiece extruded into the nut by a punch and die;

FIG. 13 is a view similar to FIG. 12 at a later moment in time showing the entering tubular portion of the nut axially collapsed to grip the workpiece extrusion;

FIG. 14 is an axial view through the nut (similar to FIG. 13) showing a panel assembled therewith by a machine screw or bolt;

FIGS. 15–19 correspond respectively to FIGS. 10–14, showing a fourth embodiment of the invention;

FIGS. 20–24 correspond respectively to FIGS. 10–14, showing a fifth embodiment of the invention;

FIG. 25 is a top view of a nut comprising a sixth embodiment of the invention;

FIG. 26 is an axial sectional view through the nut of FIG. 25;

FIG. 27 is a side view of a punch for assembling the nut of FIGS. 25 and 26 with a workpiece;

FIG. 28 is a bottom end view of the punch of FIG. 27;

FIG. 29 is an axial view of the nut of FIGS. 25 and 26 as clinched to a workpiece and assembled to a panel by a machine screw or bolt;

FIG. 30 is an axial cross section through a nut comprising a seventh embodiment of the present invention before folding of the two arms of the nut into substantial parallelism;

FIG. 31 is a plan view of the nut of FIG. 30;

FIG. 32 is a plan view of the nut of FIGS. 30 and 31 after folding of the two arms of the nut into parallelism;

FIG. 33 is an axial sectional view through the nut of FIG. 32;

FIG. 34 is a side view of a punch for assembling the nut of FIG. 33 with a workpiece;

FIG. 35 is a bottom end view of the punch of FIG. 34;

FIG. 36 is a side view of a punch generally similar to FIG. 34, but having a cylindrical cross section;

FIG. 37 is a bottom end iveew of the punch of FIG. 36;

FIG. 38 is a top view of a nut comprising an eighth embodiment of the present invention;

FIG. 39 is an axial sectional view through the nut of FIG. 38;

FIG. 40 is an axial sectional view of the nut of FIG. 39 showing a first step in assembly thereof with a workpiece by a punch and die;

FIG. 41 is a view similar to FIG. 40 showing the final step in assembly; and

FIG. 42 is an axial sectional view showing the nut and workpiece of FIG. 41 as assembled to a panel by a machine screw or bolt.

DETAILED DESCRIPTION OF THE INVENTION

The clinch nut of the present invention is shown generally at 10. A first arm 12 extends generally parallel to a second arm 14 interconnected by region 15 with each arm containing its respective aperture 16, 18. These first (16) and second (18) apertures are generally coaxial with each aperture having two portions or sections. The first portion 20 of aperture 16 is generally cylindrical while the second portion 22 has a larger diameter and may be frustoconical in shape. Both portions may have serrations 24 for a purpose described in more detail hereafter.

Second aperture 18 also has a cylindrical section 26 and a frustoconical section 28. Cylindrical section 26 has a smaller diameter than cylindrical portion 20. Cylindrical portion 20 must be larger in order to accommodate the extruded material 32 from workpiece 30. Cylindrical section 26 has a diameter which is less than the thread crest diameter of a self-tapping fastener 34. This fastener may be of either the thread-forming or thread-cutting varieties.

In using the clinch nut of the present invention, the nut 10 is positioned beneath the workpiece 30 in the region of attachment. Some form of piercing means having a diameter generally equal to the root diameter of screw 34 is plunged through the workpiece 30 into the aperture 16 forcing the material of the workpiece hole to be extruded into aperture 16 thereby staking nut 10 in place. The extrusion 32 extends at least into the second portion 22 of the aperture which has a greater diameter than the first portion so that the nut is secured against lateral and axial movement. The serrations engage the exterior of the extrusion 32 and, in fact are filled by the extrusion material inhibiting rotation of the nut.

Depending on the thickness of the workpiece 30 and the amount of closing between arms 12 and 14 that may be caused by staking, extrusion 32 can extend into section 28 and, hence, the need for serrations in it as well. Self-tapping fastener 34 is then threaded into extrusion 32 and on into section 26 whose inner diameter is specifically adapted to receive this particular size fastener. Fastener 34 clamps panel member 35 to the workpiece 30. As the fastener is tightened into section 26, arm 14 is resiliently deflected toward arm 12 in an angular fashion, thereby locking the teeth of the fastener with the newly formed threads in the clinch nut and preventing loosening of the fastener.

FIG. 5 depicts a strip of such clinch nuts 10 which have been stamped from sheet stock and remain interconnected by small material widths 36 and 38. Apertures 16 and 18 can also be easily stamped, drilled, shaped and serrated due to this configuration. Folding over of arm 12 completes the formation of the strip of clinch nuts.

FIG. 6 depicts a device 40 for automatically feeding and staking the clinch nuts. A first piston 42 is slidably mounted in frame 44 and biased upwardly by spring 46. A second piston 48 is slidably mounted within the first piston. Second piston 48 is connected to a power cylinder 50 which may be pneumatic, hydraulic or electric (i.e., a solenoid). The opposite end of the second piston has a piercing means 52 affixed thereto. A spring 54 is mounted between the moving portion of power cylinder 50 and a reaction surface 56 of cylinder 42.

Linkage member 58 is connected to power cylinder 50 at one end and to rocker arm 60 at the other. Pivotally connected to the rocker arm is a pusher finger 62. The finger 62 preferably has a plurality of tangs 64 (one of which is shown) to engage between adjacent clinch nuts 10 and advance the strip to the punch. The tangs 64 have a taper rear edge so that they may readily cam out of the slot between clinch nuts on the retraction stroke. Spring biased plunger 66 supports the strip adjacent severing edge 68.

The operation of the staking device will be more fully described in conjunction with a second clinch nut embodiment which is depicted in FIGS. 7 through 9. This alternate embodiment 110 has anti-rotation means in the form of teeth-like projections 124 located in apperture 116. Also, the second section 128 of aperture 118 is punched into the upper face of arm 114 and the displaced material forms an embossment or ring 121.

In operation, as power cylinder 50 moves downwardly, pistons 42 and 48 move downwardly together due to the fact that spring 54 is stiffer than spring 46. Piston 42 engages the upper face of workpiece 30 pushing it and the nut strip downwardly against the upward pressure of plunger 66. Material widths 36 and 38 are driven into and cut by severing edge 68. Piercing means 52 now moves downwardly into the workpiece 30 as spring 46 becomes fully compressed and spring 54 begins to collapse.

The two arms 112 and 114 may come into contact as the downward thrust of the piercing means overcomes the resilience of the intermediate portion 115 (as shown in FIG. 8). This will, of course, depend on the material from which the nut is made and the thickness of that material. It is for such a possibility that the embossment 121 is formed. Recess 118 insures that the extrusion 32 has ample space into which to move in the event the force is great enough to cause the arms to close. Embossment 121, however, acts as a reinforcement and insures that the recess 128 remains uncollapsed until the extruding is complete. When shoulder 53 engages the upper surface of the workpiece 30, it performs two functions. It blocks the upward path so that none of the extruded material can escape upwardly while piercing means 52 remains in the aperture insuring that no material can exit the lower side of the clinch nut. Further downwardly pressure causes shoulder 53 to perform its second function of causing embossment 121 to be flattened. This will cause material to collapse into the outer portions of aperture section 128, squeezing the extrusion 32 insuring that the recesses between the teeth 124 are fully occupied, (FIG. 9).

As the power cylinder 50 moves upwardly retracting piercing means 52, it also draws linkage member 58 from its dotted-line position to its solid-line position (FIG. 6) rotating rocker arm 60 in a counter-clockwise direction. This will cause tangs 64 on finger 62 to engage between adjacent clinch nuts and advance the strip. The overtravel of the pivot finger 62 (as indicated by the dotted-line position in FIG. 6) is necessary to permit withdrawal of the piercing means from workpiece 30 before advancement begins. Once piercing means 52 has been withdrawn, the workpiece may be moved laterally or longitudinally of the staking device by means not shown to vary the positioning of the clinch nuts on the workpiece as may be desired. When the downward pressure of the piercing member is removed, arm 114 will rebound to a position approaching that of arm 14 in FIG. 3. The exact amount of spring back will depend on how much deformation of intermediate portion 114 takes place (i.e., beyond the elastic limit, etc.).

The modification of the present invention is shown in FIGS. 10–14. Similar numerals are utilized with the addition of the suffix a to identify similar parts. In particular, the clinch nut 10a in this instance includes a circular, washer-like disc 12a corresponding to the upper arm 12 of the first embodiment of the invention. The nut has integral with the disc a tubular body 130 comprising an entering portion 132 and a remote portion 134. The remote portion 134 in the present embodiment is internally threaded for subsequent receipt of a retaining machine screw or bolt, such threads being indicated at 136. The remote portion 134 is of lesser diameter than the entering portion 132. The entering portion is provided with arcuately spaced longitudinal recesses 138 for subsequently non-rotationally locking the clinch nut to a workpiece. The entering and remote body portions are integrally interconnected at a shoulder 140.

As may be seen in FIGS. 12 and 13 the clinch nut 10a is permanently connected to a workpiece 30a comprising a panel or sheet made of sheet steel or the like. Such assembly is effected by a punch 142 and a die 144. The punch 142 includes a entering section 146 which has a convex extremity 148 for breaking through the workpiece 30a, and an integral secondary portion 150 of greater diameter than the entering portion, and join thereto at a shoulder 152.

The die 144 has a bore 154 and a larger diameter counterbore 156. As will be seen in FIG. 12 the remote portion 134 of the nut body is received in the counterbore 156 with the shoulder 140 resting on the upper surface 158 of the die 144. The two-stage punch 142 forces an extruded tubular portion 132a of the workpiece 30a down into the entering portion 132 of the nut body. After the parts have reached the position of FIG. 12 the die 144 is moved up, and the upper surface 158 thereof pushes up against the shoulder 140 to compress the entering portion 132 of the body 130 into a generally U-shaped or re-enterant portion, curling up the extrusion 32a at the lower edge thereof within the re-enterant entering portion 132, thereby positively to clamp the workpiece extrusion within the entering portion of the nut body.

The punch and die are withdrawn, and a work panel 35a is assembled with the nut and workpiece by means of a machine screw or bolt 34a extending through the larger diameter entering body portion 132 and threadedly engaging the threads of the remote body portion 134. As will be apparent, part of the extrusion 32a has been forced into the recesses 138 to retain the nut against rotary movement relative to the workpiece 30a and the panel 35a. It will be apparent that the axially compressed portion 138b of the body and the rolled over corresponding portion 32b of the extrusion form a tight crimp most thoroughly clinching the nut on the workpiece.

A further embodiment of the present invention is shown in FIGS. 15–19 that is quite similar to the embodiments shown in FIGS. 10–14. Similar numerals are utilized with the addition of the sufffix b to obviate the necessity of repeated description. Essential differences lie in the fact that the shoulder 140b between the entering portion 132 and the remote portion 134 of the tubular body 130 is somewhat smaller than in FIGS. 10–14. As a result, the crimp formed at 138b, 32b is of somewhat lesser diameter, which may in some circumstances be advantageous. Furthermore, the remote portion 134b of the tubular body 130b is not threaded. Accordingly, the screw or bolt 34b is of a suitable self-tapping type, made of hardened steel.

As will be apparent in FIGS. 17 and 18, the punch 142 has but a single diameter entering portion 146, rather than a two-step portion.

In the embodiments of FIGS. 10–19, the various parts are configured and of relative dimensions such that the extrusion 32a reaches substantially the entire length of the entering body portion 132, terminating substantially at the shoulder 140. Thus, the extrusion buckles or bulges outwardly along with the entering body portion to form a pair of re-enterant metal sections in the crimp.

A further embodiment of the invention is shown in FIGS. 20–24, wherein many of the parts are the same, and are identified by the same numerals with the addition of the suffix c. In the present embodiment of the invention the disc 12c is provided in a bit from the periphery with a depressed ring 160. This provides a certain stiffening or reinforcement of the disc to bring about a more pronounced edge engagement of the disc with the workpiece 30c.

At the juncture of the disc 12c and the tubular body portion 130c the nut is provided with a plurality of radially inwardly extending teeth 162 for biting into the subsequently formed extrusion 36c to prevent rotation of the nut relative to the workpiece 30c.

A further distinction as compared with the last two embodiments of the invention resides in the fact that the parts are so configured and dimensioned that the extrusion 32c does not extend all of the way down to the shoulder 140c of the body, whereby there is a gap 164 between the bottom edge of the extrusion 32c and the shoulder 140c. Consequently, when the upper or entering body portion 132 is axially compressed to form a crimped or re-enterant portion, the extrusion 32c is deflected into a peripheral flange 166. The remote body portion 134c is not formed with threads therein, and therefore the bolt 34c is of the self-tapping type.

Another embodiment of the present invention is shown in FIGS. 25, 26,and 29. A concomitant punch is shown in FIGS. 27 and 28. The present form of the invention is similar to previous forms starting with FIG. 10, and most particularly is similar to the embodiment of FIGS. 20–24. Similar part numerals are utilized with the addition of the suffix d to avoid prolixity of description. The essential difference is that the tubular body 130d is essentially triangular in cross section, rather than circular. Specifically, the entering portion 132d is provided with three flat sidewalls 168 relatively arranged at 120° angles. The sidewalls are interconnected by arcuate portions 170. Similarly, the remote portion 134d comprises three flat sidewalls 172 mutually disposed at 180°, and interconnected by arcuate wall portions 174. No threads are provided in the remote portion 134d. In previous embodiments of the invention having threadless remote portions it has been necessary to utilize self-tapping screws of one sort or another, which screws are more expensive than machine screws or both. In the present form of the invention the machine screw or bolt 34d does not have to be a thread-cutting, hardened screw. It is an ordinary machine screw or bolt which cuts partial threads in the flat sidewalls 172.

A punch for punching the workpiece and securing the clinch nut to the workpiece is shown in FIGS. 27 and 28, and is generally similar to punches previously shown. The essential difference is that the die is triangular in cross section and comprises a three-stage die. Thus, the largest diameter portion of the die 150d comprises three flat sidewalls 176 at relative 120° positions interconnected by arcuate wall portions 178. Similarly, the second die portion of lesser diameter 146d comprises three flat sidewall portions 180 at relatively 180° positions, and parallel to the flat sidewall portions 176, and interconnected by arcuate wall portions 182. This is similar to the previously noted nut tubular body sidewalls 168 and 172, which are also parallel to one another. Finally, the entering end 148d of the die comprises a triangular pyramid of lesser transverse diameter and having three flat, tapering sidewalls 184 leading to a point 186. The pyramidal projection 148d is joined to the second step 146d at a shoulder 188, the junctures of the flat walls 184 with the shoulder 188 being parallel to the respective sidewalls 176, and 180. A stepped die (not shown) is provided for cooperation with the punch 142d and is similar to the die 146c, but with the requisite triangular cross section to be complementary to the die sections 150d and 146d. The punch and die cooperate as before to stake or clinch the sheet metal nut to the workpiece 30d for assembly with a panel 35d by the machine screw or bolt 34d.

It will be apparent that the triangular shape of the sheet metal nut and of the extrusion formed in the workpiece by the die locks the nut non-rotationally to the workpiece without the necessity of providing special teeth, projections, or splines in the nut for effecting this purpose.

Another embodiment of the invention is shown in FIGS. 31–33. This embodiment is very similar to the embodiment shown in FIGS. 7–9, and similar numerals are utilized with the addition of the suffix e to identify similar parts, and thus to avoid prolixity of description. The essential difference as contrasted with FIGS. 7–9 is that the apertures 116e and 118e are of essentially triangular shape, comprising straight sides and arcuate interconnecting corner portions, similar to those previously discussed in connection with FIG. 25. It will be apparent that staking of the sheet metal nut 110e to a workpiece and subsequent securement by a machine screw or bolt to a panel is similar to that of FIGS. 7–9, except that the triangular shape of the apertures and of the extrusion obviate the need for locking teeth or the like.

A die 142e for use with the sheet metal nut of FIGS. 30–33 is shown in FIGS. 34 and 35. This die is very similar to the triangular die of FIGS. 27 and 28, and similar numerals are used to identify similar parts with the addition of the suffix e. The die is quite similar to that shown in FIGS. 27 and 28, but the flat sides 176e and 180e are relatively longer, while the arcuate interconnections or corners 178e and 182e are considerably shorter.

A multi-stage cylindrical punch is shown in FIGS. 36 and 37 to replace the punch 53 of FIGS. 6, 8, and 9. This punch is similar to the triangular punches of FIGS. 27, 28, 34, and 35, but is circular in cross section. Similar parts are identified by similar numerals with the addition of the suffix f to avoid prolixity of discussion. It will be observed that the main portion of the punch has reduced cross section, and can be considered a fourth stage for drawing of extruded metal from the workpiece. This largest diameter portion is connected to the next diameter portion 150f at a shoulder 190. The tip of the extremity 148f is provided with a slightly convex face 192 to facilitate initial penetrating and extrusion of the workpiece. Operation of the punch with a complementary die is similar to that of punch and die sets previously disclosed.

A further embodiment of the present invention is shown in FIGS. 38–42. Parts are generally similar to those heretofore shown and described, and the use of similar numerals with the addition of the suffix g avoids prolixity of disclosure. The essential difference between the present clinch nut 10g and prior nuts disclosed starting with FIG. 10 is that there is no disc-like portion joined to the body. Rather, the extremity of the entering portion 132g is provided with an inwardly directed flange 194, preferably having inwardly directed teeth 196 hereon. Thus, the extruded portion 32g of the workpiece 30g extends down into a hollow body in spaced relation therewith, except for the flange 194 which is in contact with the extrusion. The end of the extrusion terminates short of the shoulder 140g leaving a space 164g.

The punch and die for associating the clinch nut with the workpiece are similar to those previously disclosed, the die in this instance comprising a two-stage die 146g, 150g. A difference from prior die disclosures is that the second stage 150g has a peripheral flange 198 at the upper end thereof by means of which the two die stages 146g and 150g are mounted in an axial bore or recess 200 in the body of the die 142g with a spring 202 bearing down on the flange 198. This permits the unitary die stages 146g and 150g to move up against the force of the spring 202 as the die 144 is raised to collapse the entering portion 132 of the tubular body.

The remote portion 134g of the tubular body in this instance is provided with internal threads 136g for association with the machine screw or bolt 34g to hold the panel 35g to the workpiece 30g.

In each embodiment of the invention as heretofore shown and described a portion of the workpiece is extruded or swaged radially outwardly beneath a portion of the sheet metal nut to ensure retention of the nut on the workpiece. Collapsing of the remote portion or second arm of the nut places tension on the screw or bolt holding the workpiece to a panel or the like, whereby to resist loosening of the screw or bolt. Means is provided in each instance for non-rotatably locking the nut to the workpiece, and thus to ensure against loosening thereof and inadvertent turning of the nut that would resist threading in of the screw or bolt. The latter feature is particularly important when the nut is not prethreaded for receipt of such screw or bolt.

In the sheet metal clinch nuts of FIGS. 10–19 the axial length of the entering portion of the tubular body is substantially equal to the radius or transverse dimension thereof so that the workpiece material is extruded substantially to the shoulder between the two body portions. In subsequent forms of the invention the axial length is greater than the radius or transverse dimension so that there is a space between the end of the extrusion and the shoulder.

Various changes in the structure of the disclosed embodiments will no doubt occur to those skilled in the art and will be understood as forming a part of the present invention insofar as they fall within the spirit and scope of the appended claims.

The invention is claimed as follows:

1. A clinch nut in combination with a sheet metal workpiece, said nut comprising a first portion including a flange engageable with a surface of said workpiece and having therein a first aperture of predetermined radial dimension and adapted to receive an extruded portion of a workpiece, a second tubular portion initially spaced from said first portion in a direction away from the workpiece and having a second aperture therein substantially aligned with said first aperture, said second aperture having a lateral dimension at least in part less than the thread crest diameter of a threaded screw or the like extending through the first aperture and spaced therefrom by said workpiece extruded portion, an integral interconnecting section between said first portion and said second portion, and said section having a laterally enlarged deformable area communicating with said first aperture in the direction of said second sheet metal portion for receipt of a laterally extended portion of said workpiece extruded portion in underlying relation to said first portion to retain a workpiece and said nut in assembled relation, said section being sufficiently axially collapsed and thereby forming a circumferential budge of said workpiece and first portion between said flange and said second portion, said section having a length generally at least as large as said predetermined radial dimension, inwardly extending projections disposed on and extending substantially fully along said section in engagement with said extended portion of said workpiece.

2. A nut as set forth in claim 1 wherein the interconnecting section extends from an inner part of the flange.

3. A nut as set forth in claim 1 wherein the interconnecting section is tubular and forms an external shoulder adjacent said second portion directed away from the first portion.

4. A nut as set forth in claim 1 wherein the first portion comprises a ring and the interconnection extends from the periphery of said ring axially thereof away from a workpiece.

5. A nut as set forth in claim 1 wherein the first aperture is non-circular for non-rotatable interconnection with a workpiece.

6. A nut as set forth in claim 1 wherein said first aperture is of generally circular outline with radial offset sections.

7. A nut as set forth in claim 5 wherein said first aperture is substantially a polygon.

8. A nut as set forth in claim 7 wherein said polygon is a regular polygon.

9. A nut as set forth in claim 7 or claim 8 wherein said polygon is a triangle.

* * * * *